(12) United States Patent
Yao et al.

(10) Patent No.: US 10,020,741 B2
(45) Date of Patent: Jul. 10, 2018

(54) ADAPTIVE CABLE DROP COMPENSATION BASED ON SCALABLE CABLE OFFSET FACTOR

(71) Applicant: DIALOG SEMICONDUCTOR INC., Campbell, CA (US)

(72) Inventors: Jianming Yao, Cupertino, CA (US); Hien Huu Bui, San Jose, CA (US); David Nguyen, Santa Clara, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 141 days.

(21) Appl. No.: 15/312,174

(22) PCT Filed: May 29, 2015

(86) PCT No.: PCT/US2015/033304
§ 371 (c)(1),
(2) Date: Nov. 17, 2016

(87) PCT Pub. No.: WO2015/184337
PCT Pub. Date: Dec. 3, 2015

(65) Prior Publication Data
US 2017/0093295 A1    Mar. 30, 2017

Related U.S. Application Data

(60) Provisional application No. 62/005,602, filed on May 30, 2014.

(51) Int. Cl.
*H02M 3/335*    (2006.01)

(52) U.S. Cl.
CPC ....... *H02M 3/33507* (2013.01); *H02M 3/335* (2013.01); *H02M 3/33515* (2013.01)

(58) Field of Classification Search
CPC .................................................... H02M 3/335
See application file for complete search history.

(56) References Cited

U.S. PATENT DOCUMENTS

| | | |
|---|---|---|
| 2008/0278132 A1 | 11/2008 | Kesterson et al. |
| 2013/0064566 A1* | 3/2013 | Kojima ............. H02M 3/33523 399/88 |

(Continued)

OTHER PUBLICATIONS

PCT International Search Report and Written Opinion, PCT/US2015/033304, dated Sep. 3, 2015, 16 Pages.

*Primary Examiner* — Nguyen Tran
*Assistant Examiner* — Trinh Q Dang
(74) *Attorney, Agent, or Firm* — Fenwick & West LLP

(57) ABSTRACT

A power supply control system delivers regulated power to a load via a delivery cable. The power supply control system includes a power stage operable to deliver power to the load at a first regulated voltage level and a second regulated voltage level. A cable offset voltage unit generates an offset voltage signal representing a drop in voltage across the delivery cable. The offset voltage signal is generated based on a first cable drop compensation value when the power stage is operated to deliver power at the first regulated voltage level and based on a second cable drop compensation value when the power stage is operated to deliver power at the second regulated voltage level. A controller coupled to the power stage and the cable offset voltage unit controls the power stage to deliver the regulated power to the load based at least in part on the offset voltage signal.

20 Claims, 8 Drawing Sheets

(56) References Cited

U.S. PATENT DOCUMENTS

2013/0193940 A1 8/2013 Louvel
2014/0254213 A1* 9/2014 Matthews ......... H02M 3/33523
　　　　　　　　　　　　　　　　　363/21.15
2015/0194836 A1 7/2015 Teo et al.

* cited by examiner

ADAPTIVE CABLE DROP COMPENSATION BASED ON SCALABLE CABLE OFFSET FACTOR

CROSS-REFERENCE TO RELATED APPLICATIONS

This application claims the benefit of U.S. Provisional Application No. 62/005,602, filed May 30, 2014, which is incorporated herein by reference in its entirety.

BACKGROUND

The present disclosure relates generally to power supplies, and more particularly to regulation of voltage and/or current with primary-side sensing and feedback.

Power supplies, including battery chargers, may be used to deliver regulated voltage to electrical devices, including cell phones, tablets, power tools, and digital cameras, among numerous other examples. A power supply may be implemented using a commercially-available PWM (pulse width modulation) controller integrated circuit (IC). When employed in a battery charger, a PWM controller IC is configured to compensate for voltage drop on a charging cable connecting the battery charger to the battery, commonly referred to as cable drop compensation (CDC). In a conventional PWM controller, the cable voltage drop often necessitates the use of a dedicated cable compensation circuit and an extra, dedicated IC pin to attach additional electrical components for cable compensation to meet particular application specifications such as output current, output voltage, and cable resistance.

Generally, conventional cable drop compensation adjusts for the voltage drop across a cable caused by output current multiplied by the direct current resistance of the cable, commonly referred to as IR loss. As the output load current increases from 0% to 100% of the output current rating, IR losses increase from 0V to a product of the current at the maximum current rating and the resistance of the cable ($I_{MAX} \times R_{CABLE}$).

FIG. 1 shows a simplified block diagram of prior art system 100 performing cable drop compensation. In FIG. 1, a power stage 102 delivers power to a load 104 via a cable, across which is generated a cable drop 106. The power stage 102 regulates power through the load 104 based on an adjusted feedback voltage Va. In the system 100, the adjusted feedback voltage Va is generated by adjusting a feedback voltage Vfb, representing a voltage across the load 104, by an estimated voltage drop Vreg across the cable. The estimated voltage drop Vreg is represented by the output current as a percentage of the maximum rated output current, multiplied by a CDC scaling factor $CDC_0$. The CDC scaling factor $CDC_0$ is a pre-set value that is specific to the output voltage setting, output load range, and estimated resistance 416 of the cable. Accordingly, the estimated voltage drop Vreg is linearly related to the output current, as shown in FIG. 2.

However, conventional cable drop compensation systems are based on the power supply providing a fixed regulated output voltage with a predefined output load range. These cable drop compensation systems do not address power supplies capable of delivering multiple regulated output voltage levels to a device. Furthermore, the minimum and maximum current outputs through the load may vary depending on the regulated output voltage setting. Conventional CDC systems adjust for cable IR losses of one output voltage and load range setting. But since the CDC scaling factor ($CDC_0$) is a pre-set value and the actual IR losses across the cable are independent of the output voltage and load range, the cable drop compensation value will either over- or under-compensate for cable IR losses when the power supply is configured to a different output voltage and load ranges setting.

FIG. 3 illustrates that using the conventional pre-set $CDC_0$ scaling factor will result in inaccurate CDC by either under-estimating or over-estimating the cable drop. FIG. 3 illustrates cable drop compensation for two output voltage settings V1 and V2, each having a corresponding current rating (e.g., the current range of the power supply operated at V2 is smaller than the current range at V1). When the same $CDC_0$ scaling factor is used for both output voltage settings, the computed CDC value at a given output load I-LOAD has a CDC offset 302 that results in an inaccurate cable drop compensation value. For example, if the CDC scaling factor $CDC_0$ is specified based on V1 while the power stage 102 is operated to output voltage at V2, the system undercompensates for the cable drop at I-LOAD by the offset 302.

SUMMARY

A power supply control system delivering regulated power to a load via a delivery cable compensates for a voltage drop across the delivery cable caused by resistive losses in the cable. The power supply control system includes a power stage delivering the regulated power to the load, and is operable to deliver power at multiple different voltage levels. In one embodiment, the power stage is operable to deliver power at a first regulated voltage level, at which the power stage and/or the load are rated for a first maximum current rating, and a second regulated voltage level, at which the power stage and/or load are rated for a second maximum current rating.

A cable offset voltage unit of the power supply control system generates an offset voltage signal representing a drop in voltage across the delivery cable. When the power stage is operated to deliver power at the first regulated voltage level, the offset voltage signal is generated based on a first cable drop compensation value. When the power stage is operated to deliver power at the second regulated voltage level, the offset voltage signal is generated based on a second cable drop compensation value. In one embodiment, the second cable drop compensation value is generated by scaling the first cable drop compensation value by at least one of a ratio of the second regulated voltage level to the first regulated voltage level and a ratio of the second maximum current to the first maximum current.

A controller coupled to the power stage and the cable offset voltage unit controls the power stage to deliver the regulated power to the load based at least in part on the offset voltage signal. For example, the controller receives a feedback signal indicating output voltage through the load adjusted by the voltage drop across the cable, as computed by the controller or the cable offset voltage signal using the offset voltage signal.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
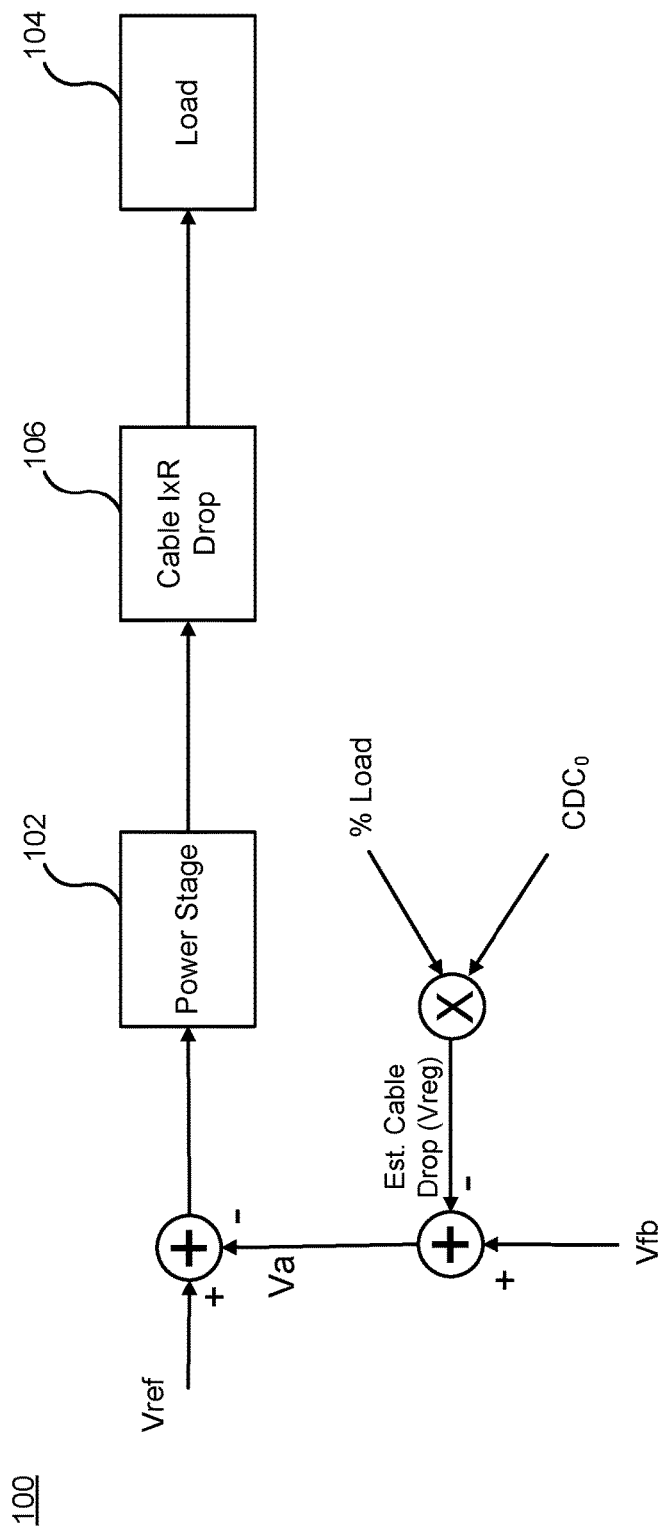
FIG. 1 is a block diagram illustrating a prior art system performing cable drop compensation.
Figure 2:
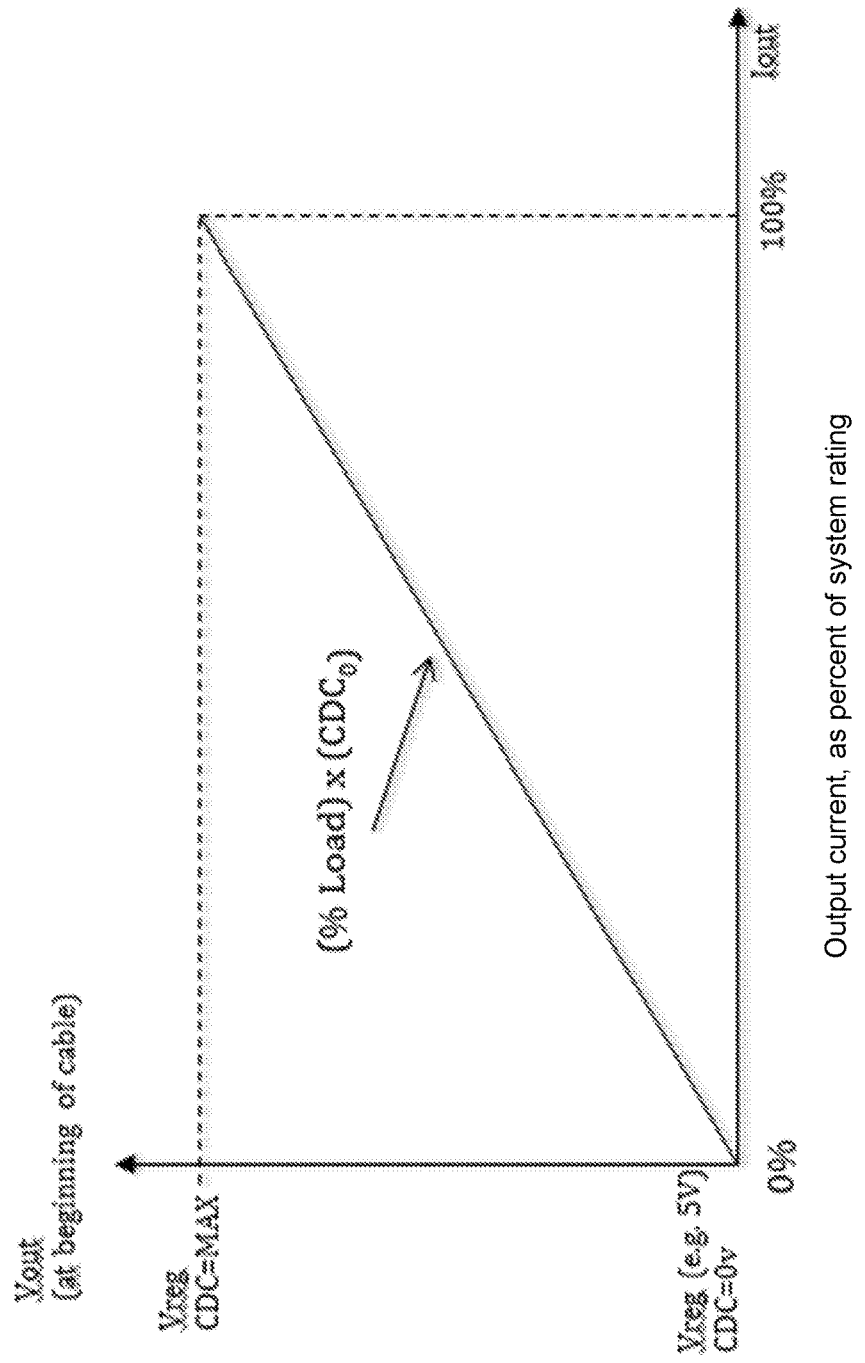
FIG. 2 illustrates cable drop compensation values in relation to output current.
Figure 3:
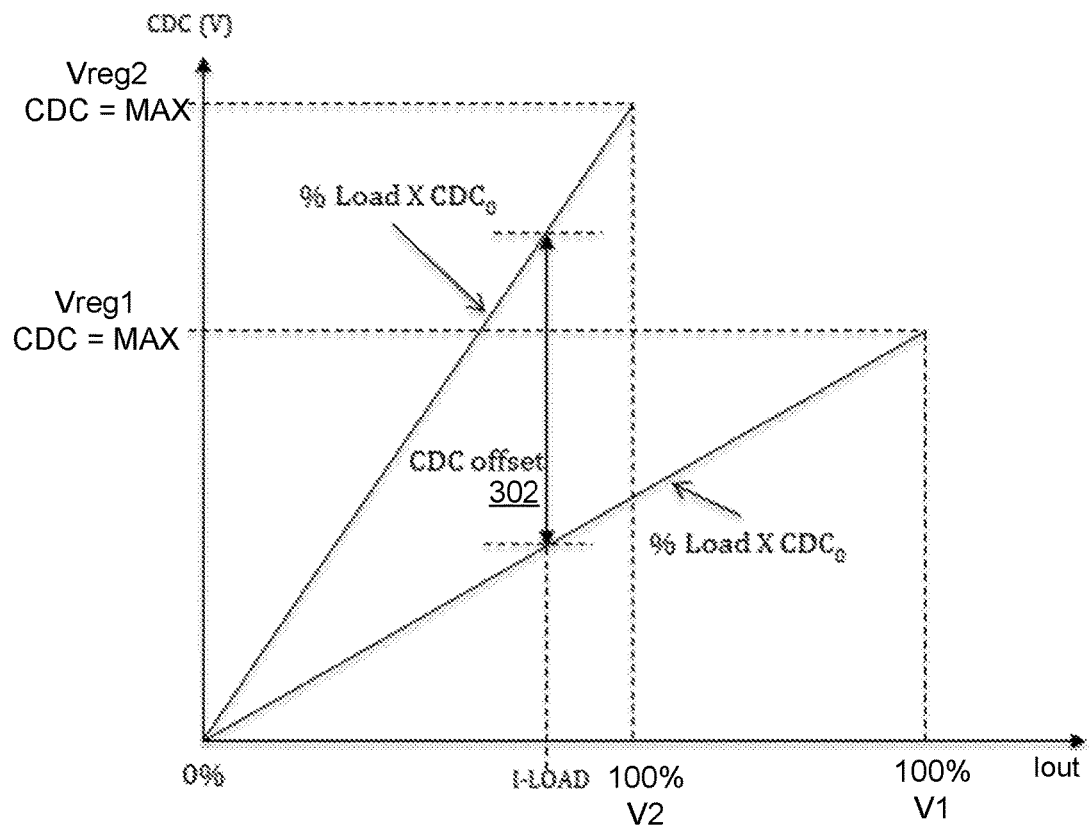
FIG. 3 illustrates inaccurate cable drop compensation values generated by a prior art system.
Figure 4:
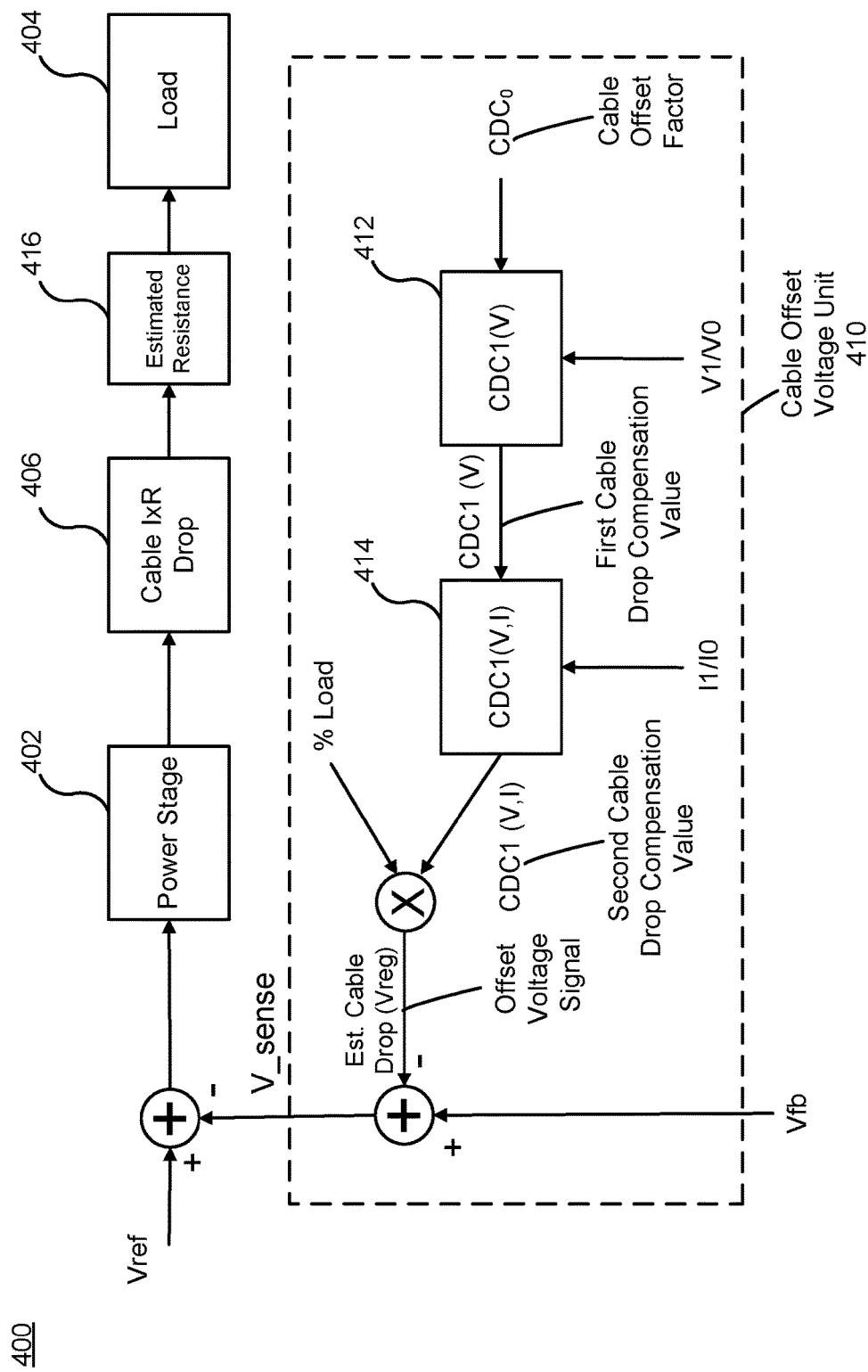
FIG. 4 illustrates a power supply system compensating for voltage drop across a cable, according to one embodiment.

FIG. 4 illustrates a power supply system 400 compensating for voltage drop across a cable delivering power to a load, according to one embodiment. The power supply system 400 takes output voltage and current settings into account when compensating for the voltage drop, enabling the power supply system 400 to more accurately compensate for IR losses in the cable at multiple different power settings. As shown in FIG. 4, one embodiment of the power supply system 400 comprises a power stage 402 delivering power to a load 404 and a cable offset voltage unit 410. Other embodiments may include additional, fewer, or different components than those shown in FIG. 4.

The power stage 402 delivers regulated power to the load 404 via a delivery cable, resistive losses in which create a cable voltage drop 406. In one embodiment, the power stage 402 includes a switching power converter delivering power to the load 404 across an inductor and regulating the power through the load 404 based on a feedback signal V_sense. In one embodiment, the power stage 402 is configured to operate under a variety of load conditions, such as the load 404 being connected to the power stage 402 and the load 404 not being connected to the power stage 402. To accommodate for different load conditions, the power stage 402 may operate under a constant voltage mode or a constant current mode. In a constant voltage mode, the power stage 402 supplies a regulated output of a fixed voltage within a specified tolerance range. When the load 404 is, for example, an electronic device charged and powered by the power stage 402, constant voltage mode generally indicates that the internal battery of the electronic device is fully charged and the fixed output voltage of the power stage 402 provides the operating power for the electronic device to be operated normally. In a constant current mode, the power stage 402 provides a fixed current output. Constant current mode indicates, for example, that the internal battery of the electronic device is not fully charged and the constant current output of the power stage 402 allows for the efficient charging of the battery.

The cable offset voltage unit 410 generates the feedback signal V_sense used by the power stage 402 to regulate the power delivered to the load 404. In general, the cable offset voltage unit 410 receives a feedback voltage Vfb indicating a voltage across the load 404, determines an offset voltage Vreg, and adjusts the feedback voltage Vfb by the offset voltage Vreg to generate V_sense. In one embodiment, the offset voltage signal Vreg, which represents an estimate of the voltage drop 406 across the delivery cable coupling the power stage 402 to the load 404, is generated using a baseline cable offset factor $CDC_0$. The baseline cable offset factor $CDC_0$ is a preset value specified for a particular combination of baseline output voltage (V0), maximum output current rating (I0) corresponding to the baseline output voltage V0, and estimated cable resistance. For example, the baseline cable offset factor $CDC_0$ is specified by a designer of the power supply system 400.

For a given output voltage V1, the power stage 402 and/or the load 404 are rated for a current up to a maximum rated current I1. That is, the power stage 402 outputs a current have a magnitude less than or equal to I1. To generate the offset voltage signal Vreg, the cable offset voltage unit 410 receives (e.g., from the power stage 402) the operating voltage V1 of the power stage 402 and a magnitude of the current output by the power stage 402. The cable offset voltage unit 410 scales the baseline cable offset factor $CDC_0$ by a ratio of V1 to the baseline output voltage V0, by a ratio of I1 to the maximum rated current I0 at the baseline voltage V0, or by both ratios. The scaled cable offset factor is multiplied by the magnitude of the actual output current from the power stage 402 as a percentage of the maximum rated current I1, generating the offset voltage signal Vreg. The cable offset voltage unit 410 then subtracts Vreg from the feedback voltage Vfb, generating the signal V_sense that is input to the power stage 402 for controlling regulated power through the load 404.

As shown in FIG. 4, one embodiment of the cable offset voltage unit 410 includes a first compensation block 412 and a second compensation block 414. The first compensation block 412 scales the baseline cable offset factor $CDC_0$ by a ratio of V1 to the baseline output voltage V0, and outputs a value CDC1(V), representing the offset factor scaled by voltage, to the second compensation block 414. The second compensation block 414 scales CDC1(V) by a ratio of I1 to the current rating I0 corresponding to the baseline output voltage V0, generating a value CDC1(V,I). Thus, for example, CDC1(V,I) may be given by the following expression:

$$CDC1(V, I) = CDC_0\left(\frac{V1}{V0}\right)\left(\frac{I1}{I0}\right)$$

If the magnitude of the actual output current from the power stage 402 is Ii, Vreg is then given by:

$$Vreg = CDC1(V, I)\left(\frac{Ii}{I1}\right)$$

Finally, the feedback signal V_sense is computed as:

$$V_{sense} = Vfb - Vreg$$

The cable offset voltage unit 410 may scale the baseline offset factor $CDC_0$ by both the ratio of the voltage setting to the baseline voltage and the ratio of the current rating corresponding to the voltage setting to the baseline current, or may scale the baseline offset factor $CDC_0$ by either the voltage ratio or the current ratio. Furthermore, although FIG. 4 illustrates the first compensation block 412 scaling the baseline offset factor $CDC_0$ by voltage prior to the second compensation block 414 scaling by the current rating, the baseline offset factor $CDC_0$ may in other embodiments be scaled by the current ratio prior to being scaled by the voltage ratio.

In another embodiment, the cable offset voltage unit 410 receives a signal indicating a magnitude of the instantaneous output current from the power stage 402. The cable offset voltage unit 410 generates the offset voltage signal Vreg using the instantaneous output current and an estimate of the resistance of the delivery cable. For example, if $I_i$ is the magnitude of the output current and $R_c$ is the estimated resistance 416 of the delivery cable (as specified, for example, by a designer of the power supply system 400), the cable offset voltage unit 410 generates the offset voltage signal Vreg by the following equation:

$$Vreg = I_i \times R_c$$

The cable offset voltage unit 410 may periodically receive the instantaneous output current and generate a new Vreg value, such as during each switching cycle of the power stage 402 switch.

Figure 5:
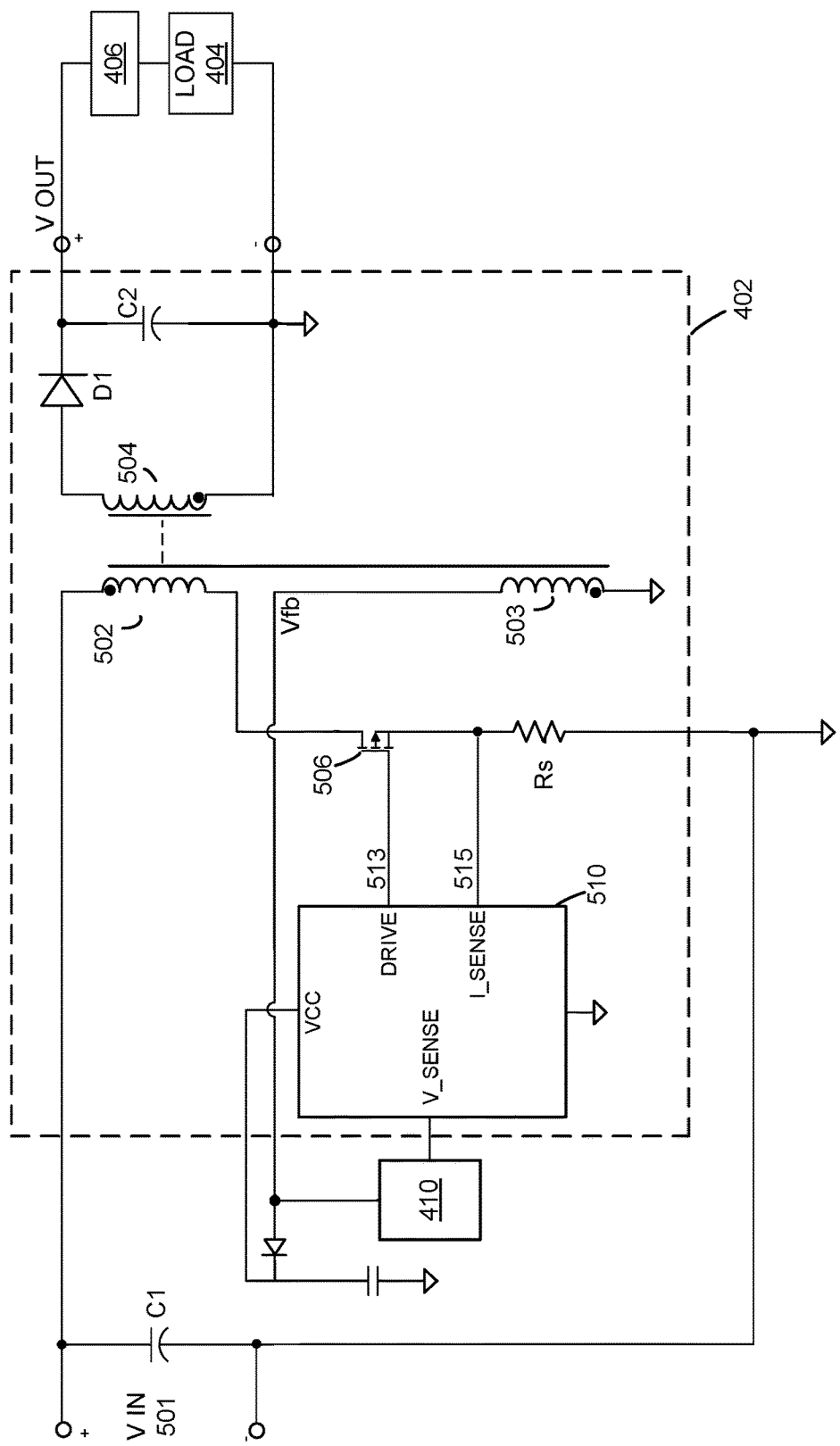
FIG. 5 illustrates an example power stage employing primary-side feedback and control, according to one embodiment.

FIG. 5 illustrates an example embodiment of the power stage 402 employing primary-side feedback and control. In one embodiment, the power stage 402 includes, among other components, a transformer with primary winding 502, secondary winding 504, and auxiliary winding 503; a power switch 506; and a controller 510. Other embodiments of the power stage 402 may include additional, fewer, or different components, and may have a different configuration than shown in FIG. 5. For example, while FIG. 5 illustrates the power stage 402 comprising a switching power converter configured in a flyback topology, the power stage 402 may alternatively be configured as a boost topology, a buck-boost topology, or any other power converter topology suitable for delivering power to the load 404 across an inductor.

Referring to the example of FIG. 5, the power stage 402 receives AC power from an AC power source (not shown), which is rectified to provide the regulated DC input voltage 501 across an input capacitor C1. Input voltage 501 is coupled to the primary winding 502. During ON cycles of the power switch 506, energy is stored in the primary winding 502 because the rectifier $D_1$ is reverse biased. The energy stored in the primary winding 502 is released to the secondary winding 504 and transferred to the load 520 across the capacitor C2 during the OFF cycles of the power switch 506 because the rectifier $D_1$ becomes forward biased. After the power switch 506 turns off, the rectifier D1 conducts current to the output of the switching power stage 402.

The primary-side controller 510 generates a control signal 513 to turn on or turn off power switch 506. The controller 510 senses current I_sense through the primary winding 502 in the form of a voltage 515 across a sense resistor Rs. The current I_sense is proportional to the current through the load 404 by a turns ratio of the transformer. The controller 510 also receives the feedback signal V_SENSE, indicating the output voltage Vout adjusted by the cable drop compensation generated by the cable offset voltage unit 410. In one embodiment, the output voltage Vout is reflected as the feedback voltage Vfb across the auxiliary winding 503 of the transformer during off cycles of the power switch 506. The cable offset voltage unit 410 is coupled to the auxiliary winding 503 to receive the feedback voltage Vfb. Any of a variety of other mechanisms for sensing the output voltage Vout of the power stage 402 may be used instead of measuring the voltage across the auxiliary winding 503.

The controller 510 controls switching of the power switch 506 to regulate the output voltage Vout based on V_sense or to regulate output current through the load 404 based on I_sense. The controller 510 can employ any one of a number of modulation techniques, such as pulse-width-modulation (PWM) or pulse-frequency-modulation (PFM), to control the ON and OFF states and duty cycles of the power switch 506 to regulate the output voltage Vout and current through the load 404. In one embodiment, the controller 510 also communicates current and voltage settings to the cable offset voltage unit 410 for generating the offset voltage signal.

Figure 6:
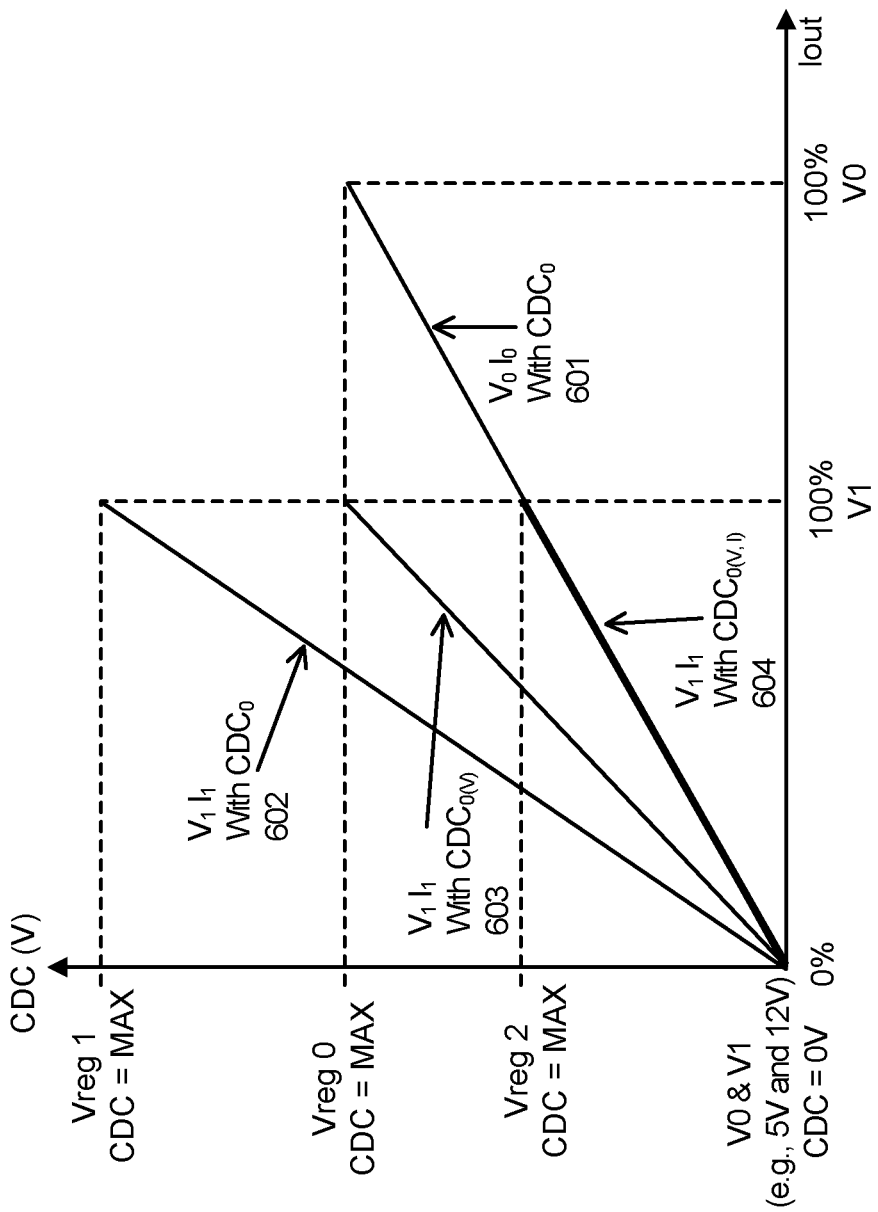
FIG. 6 illustrates example cable drop compensation values for two output voltage settings, according to one embodiment.

FIG. 6 illustrates various cable drop compensation values generated by the cable offset voltage unit 410, for two output voltage settings V0 and V1 of the power stage 402. The power stage 402 and/or the load 404 are rated for a maximum output current I0 when operated at V0, and are rated for a maximum output current I1 when operated at V1. As shown in FIG. 6, the cable offset voltage unit 410 generates a CDC value along line 601 for output voltage V0, by scaling the baseline cable offset factor $CDC_0$ by the output current as a percentage of I0. For example, if the power stage 402 is operated to output the maximum rated current I0 at voltage V0, the cable offset voltage unit 410 generates an offset voltage signal of Vreg0 shown in FIG. 6. Line 602 represents CDC values generated for operating the power stage 402 at voltage V1, without adjusting for the different output voltage and maximum output current of the power stage 402. For example, if the power stage 402 is operated to output the maximum rated current I1 at voltage V1, generating an offset voltage signal without compensating for the voltage or current differences would result in Vreg1. Adjusting the baseline CDC value by the ratio of V1 to V0 results in an offset voltage signal generated along line 603 (e.g., generating an offset voltage of Vreg0 when the power stage is operated to output current I1), while compensating for both the ratio of V1 to V0 and I1 to I0 results in CDC values generated along line 604 (e.g., generating an offset voltage of Vreg2 for an output current of I1). As illustrated in FIG. 6, the slope of line 604 is the same as the slope of line 601 because the actual IR losses across the cable are not dependent on the output voltage or the rated voltage range. Changing the output voltage and load range therefore does not affect the slope of the cable drop compensation value when the cable offset voltage unit 410 compensates for differences in both the output voltage range and the output current rating.

Figure 7:
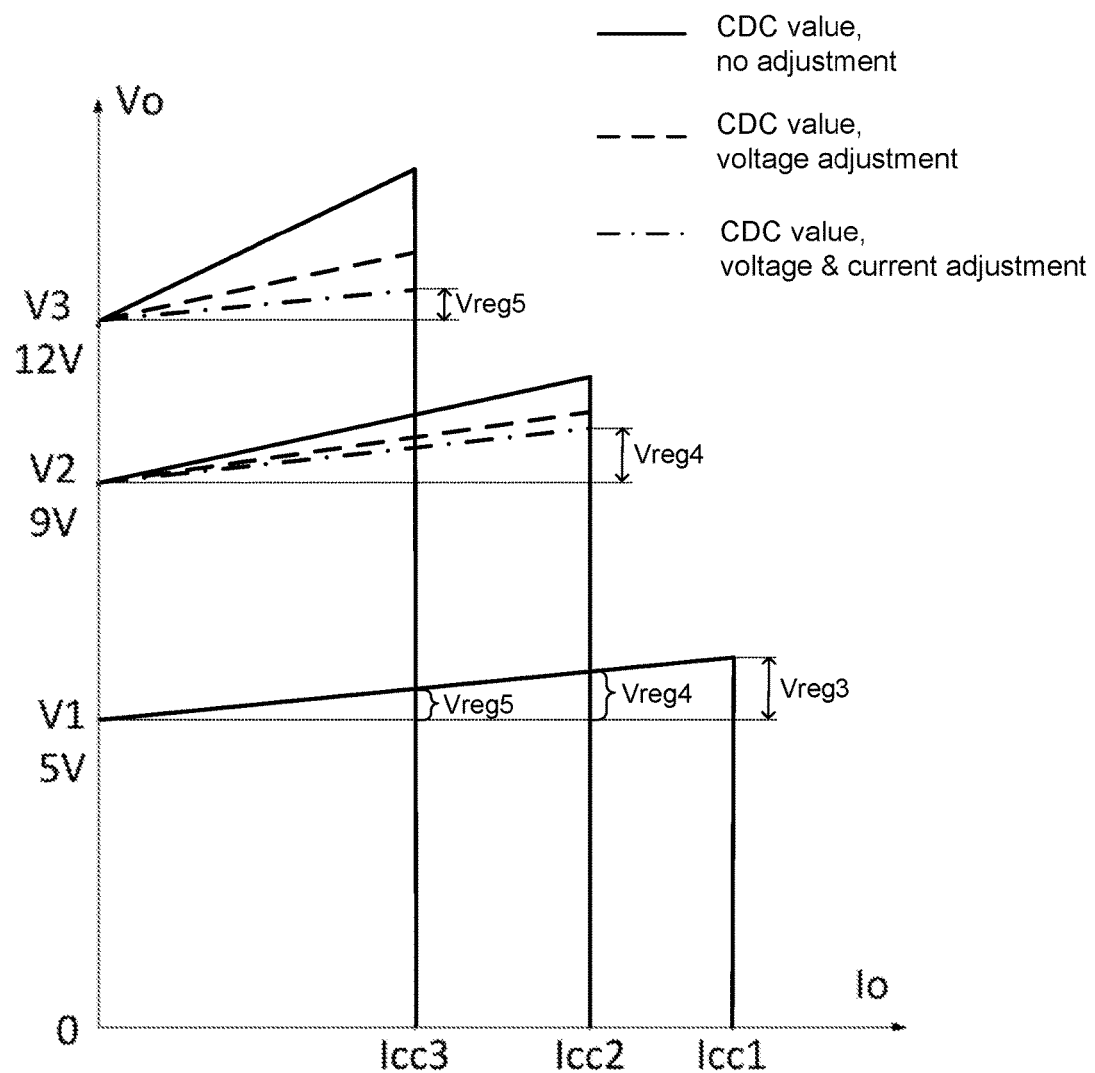
FIG. 7 illustrates example cable drop compensation values for three output voltage settings, according to one embodiment.

FIG. 7 illustrates three example output voltage settings of the power stage 402 (V1=5V, V2=9V, and V3=12V) and the CDC values generated across the range of current values for which the load is rated at each of the voltage settings. In the example of FIG. 7, the baseline cable offset factor $CDC_0$ is specified for the 5V output, and the CDC values for 9V and 12V are computed by adjusting the baseline factor based on voltage and/or current ratios. At the maximum current loads Icc1, Icc2, and Icc3 for each of the voltage settings (as example current outputs used to compute CDC values), the cable offset voltage unit 410 generates offset voltages of, respectively, Vreg3, Vreg4, and Vreg5. As shown in FIG. 7, the offset voltages Vreg3, Vreg4, and Vreg5 computed by the cable offset voltage unit 410 more accurately reflect the actual voltage drop across the cable (e.g., by not overcompensating for the cable voltage drop), and are independent of the output voltage level.

Figure 8A:
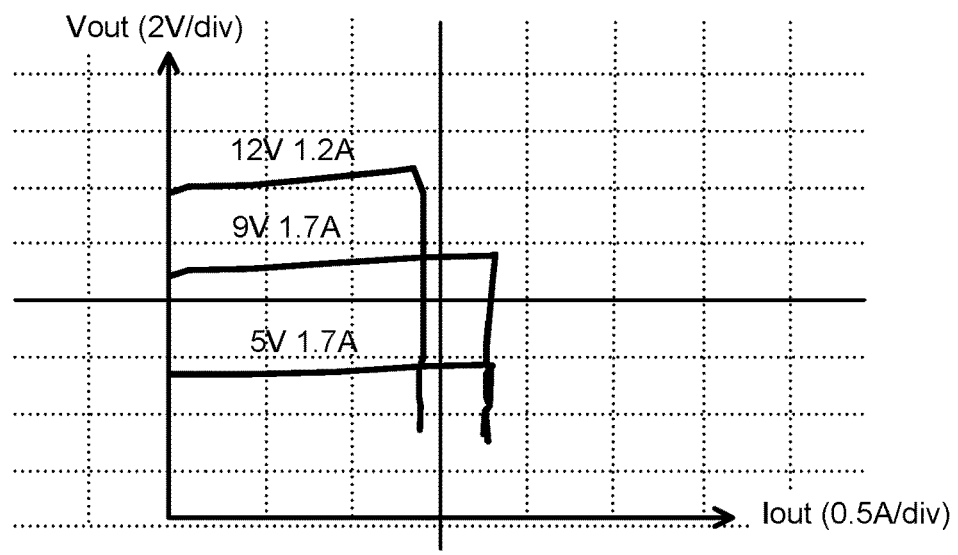
FIG. 8A illustrates example experimental results before adjusting cable drop compensation values based on output voltage and current settings, according to one embodiment.
Figure 8B:
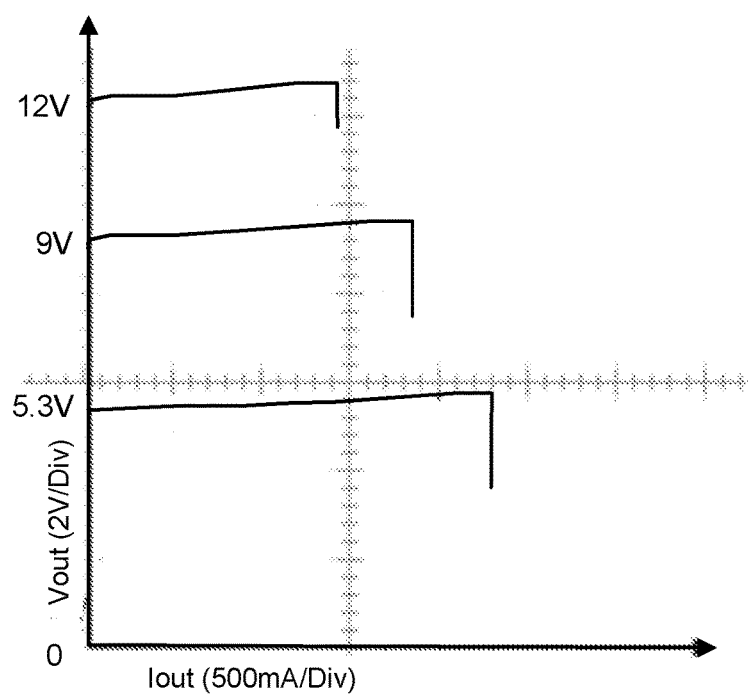
FIG. 8B illustrates example experimental results after adjusting cable drop compensation values based on output voltage and current settings, according to one embodiment.

FIGS. 8A-8B illustrate experimental results before (FIG. 8A) and after (FIG. 8B) adjusting cable drop compensation values based on the output voltage settings and corresponding maximum current ratings. Similar to FIG. 7, FIGS. 8A-8B illustrate offset voltages adjusted by voltage and current ratios more accurately reflect actual voltage drop across the cable than offset voltages generated without adjustment.

Upon reading this disclosure, those of skill in the art will appreciate still additional alternative designs for a line frequency detector. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein.

What is claimed is:

1. A power supply control system delivering regulated power to a load via a delivery cable, the power supply control system comprising:
   a power stage delivering the regulated power to the load, the power stage operable to deliver power to the load at a first regulated voltage level and a second regulated voltage level, wherein the load is rated for a first maximum current at the first regulated voltage level and a second maximum current at the second regulated voltage level;
   a cable offset voltage unit generating an offset voltage signal representing a drop in voltage across the delivery cable, the cable offset voltage unit configured to:
      generate the offset voltage signal based on a cable offset factor when the power stage is operated to deliver power at the first regulated voltage level, and
      generate the offset voltage signal based on scaling the cable offset factor by at least one of a ratio of the second regulated voltage level to the first regulated voltage level and a ratio of the second maximum current to the first maximum current when the power stage is operated to deliver power at the second regulated voltage level; and
   a controller coupled to the power stage and the cable offset voltage unit, the controller controlling the power stage to deliver the regulated power to the load in response to a feedback signal representing a voltage across the load adjusted based on the offset voltage signal.

2. The power supply control system of claim 1, wherein generating the offset voltage signal based on the cable offset factor comprises multiplying the cable offset factor by a ratio of a current delivered to the load to the first maximum current.

3. The power supply control system of claim 1, wherein the power stage comprises:
   a transformer including a primary winding coupled to an input voltage and a secondary winding coupled to the load;
   a switch coupled to the primary winding of the transformer, current in the primary winding being generated responsive to the switch being turned on and not generated responsive to the switch being turned off;
   wherein the controller generates a control signal to turn on or turn off the switch based on the feedback signal.

4. The power supply control system of claim 1, wherein the cable offset voltage unit receives a signal from the controller indicating an output voltage setting of the power stage and a magnitude of current through the load, and generates the offset voltage signal using the received output voltage setting and amount of current through the load.

5. The power supply control system of claim 1, wherein the cable offset factor is specified for the first regulated voltage level, the first maximum current, and an estimated resistance of the delivery cable.

6. The power supply control system of claim 3, wherein the transformer further comprises:
   an auxiliary winding on a primary side of the transformer, output voltage across the secondary winding being reflected as feedback voltage across the auxiliary winding during off-cycles of the switch;
   wherein the feedback signal is generated based on the feedback voltage across the auxiliary winding.

7. A power supply control system delivering regulated power to a load via a delivery cable, the power supply control system comprising:
   a power stage delivering the regulated power to the load, the power stage operable to deliver power to the load at a first regulated voltage level and a second regulated voltage level;
   a cable offset voltage unit generating an offset voltage signal representing a drop in voltage across the delivery cable, the offset voltage signal generated based on a first cable drop compensation value when the power stage is operated to deliver power at the first regulated voltage level and based on a second cable drop compensation value when the power stage is operated to deliver power at the second regulated voltage level; and
   a controller coupled to the power stage and the cable offset voltage unit, the controller controlling the power stage to deliver the regulated power to the load based at least in part on the offset voltage signal.

8. The power supply control system of claim 7, wherein generating the offset voltage signal based on the first cable drop compensation value comprises:

scaling the first cable drop compensation value based on a ratio of a current delivered to the load to a maximum rated current of the load at the first regulated voltage level.

9. The power supply control system of claim 7, wherein the cable offset voltage unit is further configured to:
determine a ratio of the second regulated voltage level to the first regulated voltage level; and
generate the second cable drop compensation value by scaling the first cable drop compensation value based on the determined ratio.

10. The power supply control system of claim 7, wherein the load is rated for a first maximum current at the first regulated voltage level and a second maximum current at the second regulated voltage level, and wherein the cable offset voltage unit is configured to:
generate the second cable drop compensation value by scaling the first cable drop compensation value based on a ratio of the second maximum current to the first maximum current.

11. The power supply control system of claim 7, wherein the load is rated for a first maximum current at the first regulated voltage level and a second maximum current at the second regulated voltage level, and wherein the cable offset voltage unit is further configured to:
determine a ratio of the second regulated voltage level to the first regulated voltage level;
determine a ratio of the second maximum current to the first maximum current; and
generate the second cable drop compensation value by scaling the first cable drop compensation value based on the ratio of the second regulated voltage level to the first regulated voltage level and the ratio of the second maximum current to the first maximum current.

12. The power supply control system of claim 7, wherein the power stage comprises:
a transformer including a primary winding coupled to an input voltage and a secondary winding coupled to the load; and
a switch coupled to the primary winding of the transformer, current in the primary winding being generated responsive to the switch being turned on and not generated responsive to the switch being turned off;
wherein the controller generates a control signal to turn on or turn off the switch based on a feedback signal representing a voltage across the load adjusted by the offset voltage signal.

13. The power supply control system of claim 7, wherein the cable offset voltage unit is further configured to:
receive a signal representing an instantaneous output current from the power stage; and
generate the second cable drop compensation value based on a resistance of the delivery cable and the instantaneous output current.

14. The power supply control system of claim 12, wherein the transformer further comprises:
an auxiliary winding on a primary side of the transformer, output voltage across the secondary winding being reflected as feedback voltage across the auxiliary winding during off-cycles of the switch;
wherein the feedback signal is generated based on the feedback voltage across the auxiliary winding.

15. A method for operating a power supply control system to deliver regulated power to a load via a delivery cable, the power supply control system comprising a power stage configured to deliver the regulated power to the load at a first regulated voltage level and a second regulated voltage level, the method comprising:
operating the power stage to deliver the regulated power to the load at one of the first regulated voltage level and the second regulated voltage level;
generating an offset voltage signal representing a drop in voltage across the delivery cable, the offset voltage signal generated based on a first cable drop compensation value responsive to delivering the regulated power to the load at the first regulated voltage level and based on a second cable drop compensation value responsive to delivering the regulated power to the load at the second regulated voltage level wherein the second cable drop compensation value is obtained by scaling the first cable drop compensation value; and
controlling the power stage based at least in part on the offset voltage signal.

16. The method of claim 15, wherein generating the offset voltage signal based on the first cable drop compensation value comprises:
scaling the first cable drop compensation value based on a ratio of a current delivered to the load to a maximum rated current of the load at the first regulated voltage level.

17. The method of claim 15, further comprising:
determining a ratio of the second regulated voltage level to the first regulated voltage level; and
generating the second cable drop compensation value by scaling the first cable drop compensation value based on the determined ratio.

18. The method of claim 15, wherein the load is rated for a first maximum current at the first regulated voltage level and a second maximum current at the second regulated voltage level, the method further comprising:
generating the second cable drop compensation value by scaling the first cable drop compensation value based on a ratio of the second maximum current to the first maximum current.

19. The method of claim 15:
wherein the power stage comprises:
a transformer including a primary winding coupled to an input voltage and a secondary winding coupled to the load;
a switch coupled to the primary winding of the transformer, wherein current is generated in the primary winding responsive to the switch being turned on and is not generated responsive to the switch being turned off; and
an auxiliary winding on a primary side of the transformer, output voltage across the secondary winding being reflected as feedback voltage across the auxiliary winding during off-cycles of the switch; and
wherein controlling the power stage based at least in part on the offset voltage signal comprises generating a control signal to turn on or turn off the switch based on the feedback voltage across the auxiliary winding adjusted by the offset voltage signal.

20. A method for operating a power supply control system to deliver regulated power to a load via a delivery cable, the power supply control system comprising a power stage configured to deliver the regulated power to the load at a first regulated voltage level and a second regulated voltage level, the method comprising:
operating the power stage to deliver the regulated power to the load at one of the first regulated voltage level and the second regulated voltage level;

generating an offset voltage signal representing a drop in voltage across the delivery cable, the offset voltage signal generated based on a first cable drop compensation value responsive to delivering the regulated power to the load at the first regulated voltage level and based on a second cable drop compensation value responsive to delivering the regulated power to the load at the second regulated voltage level;

controlling the power stage based at least in part on the offset voltage signal;

receiving a signal representing an instantaneous output current from the power stage; and generating the second cable drop compensation value based on a resistance of the delivery cable and the instantaneous output current.

* * * * *